No. 867,993. PATENTED OCT. 15, 1907.
E. MUELLER.
TOOL HOLDER.
APPLICATION FILED DEC. 5, 1906.
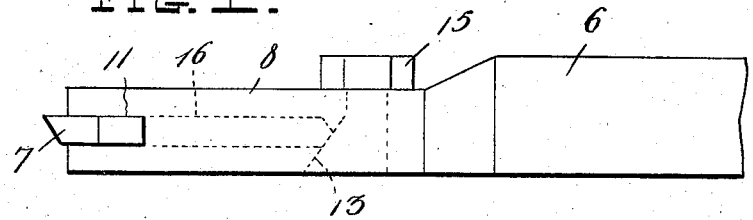
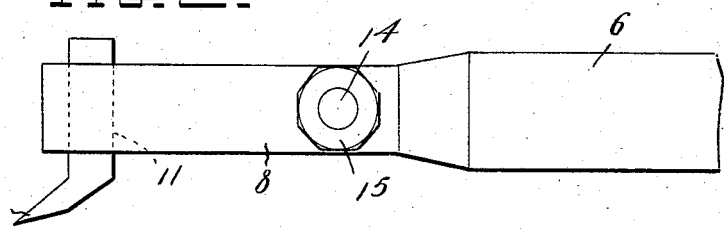
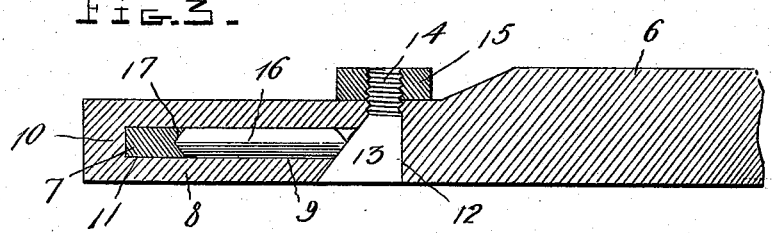
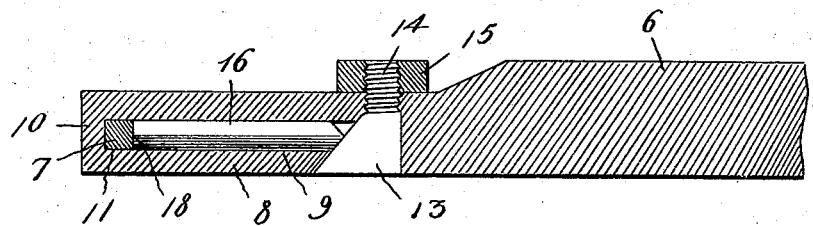
Witnesses
Emil Mueller,
Inventor

UNITED STATES PATENT OFFICE.

EMIL MUELLER, OF CHICAGO, ILLINOIS.

TOOL-HOLDER.

No. 867,993.  Specification of Letters Patent.  Patented Oct. 15, 1907.

Application filed December 5, 1906. Serial No. 346,418.

*To all whom it may concern:*

Be it known that I, EMIL MUELLER, a citizen of the United States, residing at Chicago, in the county of Cook and State of Illinois, have invented certain new and useful Improvements in Tool-Holders, of which the following is a specification.

This invention relates to tool holders and especially those used in connection with boring or turning lathes.

The object of the invention is to provide novel and improved means for holding an inserted blade or cutter in the stock or boring bar, in such manner that it will be tightly clamped, but nevertheless may be quickly removed and another blade substituted when desired.

The invention is illustrated in the accompanying drawings, in which

Figure 1 is a side elevation of the holder. Fig. 2 is a top view. Fig. 3 is a longitudinal section. Fig. 4 is a similar section of the modification.

Referring specifically to the drawings, 6 indicates a boring bar which answers as a stock in which the inserted blade is held. The end of the bar is reduced, as at 8, and said reduced portion is bored lengthwise as at 9, leaving a solid part 10 at the outer end of the bore, against which part the blade is clamped. At the outer end of the bore is a cross slot 11, extending through the bar, and the blade 7 is inserted through this slot. The slot is inclined to give a proper or desired angle to the tool. At the other or rear end of the bore is a cross slot 12 which receives a wedge key 13 having at its small end a threaded stem 14 which projects beyond the surface of the bar and receives a nut 15. The inclined edge of the key 13 bears against the inclined rear end of the clamping pin 16 which fits and is slidable lengthwise in the bore 9, and the front end of the pin bears against the blade 7. The blade may have a depression in the edge to receive the end of the pin, which is then made pointed as indicated at 17. Or the edge of the blade and the end of the pin may be left squared, as indicated at 18, Fig. 4.

The end of the bar 6 is reduced, as at 8, so that the nut 15 may lie within the circumferential line of the bar, as shown, thereby allowing the boring bar to be used on work of less diameter than would otherwise be the case. The wedge action of the key 13 causes the clamping pin 16 to bind tightly against the edge of the blade forcing the same against the solid end 10 of the bar with sufficient pressure to hold the blade. The blade may be quickly released by unscrewing the nut and loosening the key.

I claim:

A tool holder comprising a bar, having a reduced end which has a longitudinal bore and cross slots at opposite ends of the bore, a blade in one of the slots, a wedge key in the other slot having a threaded stem provided with a nut located on said reduced end within the circumferential line of the bar, and a sliding pin in the bore fitting at one end against the blade and at the other end against the key.

In testimony whereof I affix my signature, in presence of two witnesses.

EMIL MUELLER.

Witnesses:
 H. G. BATCHELOR,
 NILS RYERSON.